(12) United States Patent
Kato

(10) Patent No.: US 6,714,507 B2
(45) Date of Patent: Mar. 30, 2004

(54) DISC DEVICE

(75) Inventor: Kazunari Kato, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 169 days.

(21) Appl. No.: 09/938,045

(22) Filed: Aug. 23, 2001

(65) Prior Publication Data

US 2002/0067687 A1 Jun. 6, 2002

(30) Foreign Application Priority Data

Aug. 25, 2000 (JP) ........................................ 2000-255297

(51) Int. Cl.⁷ .......................... G11B 23/00; G11B 25/00; G11B 33/02
(52) U.S. Cl. ........................................ 369/271; 369/75.2
(58) Field of Search ................................. 369/271, 270, 369/264, 262, 258, 176, 75.2

(56) References Cited

U.S. PATENT DOCUMENTS

| | | | |
|---|---|---|---|
| 4,969,140 A | * 11/1990 | Koiwa et al. | 369/77.1 |
| 5,956,315 A | 9/1999 | Sawai et al. | 369/270 |
| 6,072,767 A | * 6/2000 | Iwazawa | 369/271 |
| 6,353,591 B1 | * 3/2002 | Kato | 369/270 |

FOREIGN PATENT DOCUMENTS

| | | | |
|---|---|---|---|
| EP | 0428382 A2 | * | 5/1991 |
| JP | 58-194181 A | * | 11/1983 |
| JP | 2-235250 A | * | 9/1990 |

* cited by examiner

Primary Examiner—Hoa T. Nguyen
Assistant Examiner—Julie Anne Watko
(74) Attorney, Agent, or Firm—Brinks Hofer Gilson & Lione

(57) ABSTRACT

A disc device in which, when a driving unit including a self-chucking-type rotatable table is moving towards the front, a disc is transported by a transporting roller, and is sent between the rotatable table and a guiding plate. At this position, a driving unit moves upward, causing the disc to be sandwiched between the rotatable table and the guiding plate, so that the disc is clamped to the rotatable table. Thereafter, the driving unit moves downward, and moves further towards the back side of a housing in order for the disc to be drawn into the housing. A disc device using a self-chucking-type rotatable table requires a complicated mechanism for pushing a disc against the rotatable table, so that it is difficult to reduce the size of the disc device.

19 Claims, 11 Drawing Sheets

DISC DEVICE

BACKGROUND OF THE INVENTION

1. Field of the Invention

The present invention relates to a disc device whose structure can be made thin, in which a disc having a center aperture is loaded, and the center aperture of the disc is held by a rotatable table.

2. Description of the Related Art

FIG. 13 is an enlarged sectional view of a disc-clamping means of a conventional disc device.

A rotatable table 1 is secured to a rotatable shaft 2a of a spindle motor 2, and is rotationally driven by the spindle motor 2. In the rotatable table 1, a disc-receiving portion 1a and a protrusion 1b are integrally formed. A clamping member 3, which opposes the rotatable table 1, is rotatably supported by a clamping arm 4.

While the clamping member 3 and the rotatable table 1 are separated from each other as a result of the upward rotation of the clamping arm 4, a disc D transported by a transporting roller 5 is supplied between the rotatable table 1 and the clamping member 3. When the disc D is positioned at a location where a center aperture D1 of the disc D matches the location of the protrusion 1b, the clamping arm 4 moves downward, so that the surrounding portion of the center aperture D1 of the disc D is clamped by the disc-receiving section 1 a of the rotatable table 1 and the clamping member 3.

As shown in FIG. 13, while the disc D is clamped to the rotatable table 1, the disc D is rotationally driven by the spindle motor 2 in order to reproduce or record data by a head opposing the disc D.

In the conventional disc clamping means shown in FIG. 13, the clamping member 3, disposed above the rotatable table 1, opposes the rotatable table 1, so that, as a mechanism for clamping a disc, a height equal to or greater than the sum of the thickness of the spindle motor 2, the thickness of the rotatable table 1, and the thickness of the clamping member 3 is required. Therefore, the overall height becomes large, so that there is a limit as to how thin the clamping means can be made.

One type of disc-clamping means is what is called a self-chucking type, in which a disc-holding means that elastically applies pressure to the peripheral edge portion defining the center aperture D1 of the disc D is provided at the protrusion 1b of the rotatable table 1. When the rotatable table of the self-chucking type is used, the clamping member 3 is not required, thereby making it possible to make the disc-clamping means thinner.

However, in the rotatable table of the self-chucking type, it is necessary to use a pushing means for pushing the peripheral portion defining the center aperture of the disc against the disc-receiving section of the rotatable table in order to elastically fit the disc-holding means to the center aperture of the disc. Therefore, the structure of the disc-clamping means becomes complicated.

Accordingly, in order to overcome the above-described problems, it is an object of the present invention to provide a disc device which makes it possible to clamp a disc by using a self-chucking-type rotatable table and a simple structure, and whose overall structure can be made thin.

SUMMARY OF THE INVENTION

In accordance with the present invention, there is provided a disc device with a simplified structure that can be made thin.

According to one aspect of the present invention, the disc device includes a rotatable table including a disc-receiving portion for receiving a surface of a disc, a protrusion for insertion into a center aperture of the disc, and a disc-holding member for elastically applying pressure to an inner peripheral edge surrounding the center aperture of the disc. A pressing member is provided that opposes the disc-receiving portion of the rotatable table. A pressing driver drives at least one of the rotatable table and the pressing member in a direction in which the rotatable table and the pressing member move towards each other in a manner that causes the disc-holding member to engage the inner peripheral edge of the disc.

According to another aspect of the invention, a disc device is provided that includes a rotatable table including a disc-receiving portion for receiving a surface of a disc, a protrusion for insertion into a center aperture of the disc, and a disc-holding member for elastically applying pressure to an inner peripheral edge surrounding the center aperture of the disc. A plate member is provided that opposes the disc-receiving portion of the rotatable table. A driving chassis, which supports the rotatable table, is movable relative to the plate member. A pressing driver drives the rotatable table toward the plate member in a manner that causes the disc-holding member to engage the inner peripheral edge of the disc. A disc passage space is formed between the plate member and the table when the plate member and the rotatable table are separated from each other. The plate member functions as a guide plate for the disc that passes into the passage space.

According to another aspect of the invention, a disc device is provided that includes a rotatable table including a disc-receiving portion for receiving a surface of a disc, a protrusion for insertion into a center aperture of the disc, and a disc-holding means for elastically applying pressure to an inner peripheral edge surrounding the center aperture of the disc. A pressing member opposing the disc-receiving portion of the rotatable table. A pressing member support shaft rotatably supports the pressing member. A pressing driver drives the pressing member toward the rotatable table in a manner that causes the disc-holding member to engage the inner peripheral edge of the disc.

DETAILED DESCRIPTION OF THE INVENTION

Figure 1A:
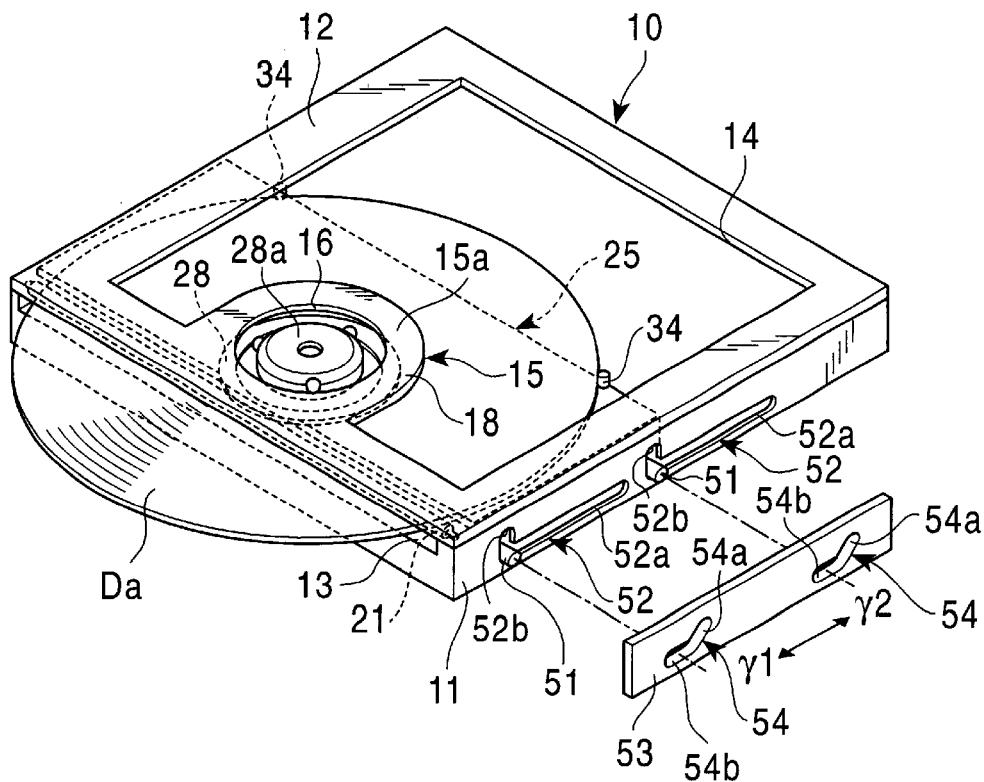
FIG. 1A is a perspective view of a first preferred embodiment of a disc device in accordance with the present invention.
Figure 1B:
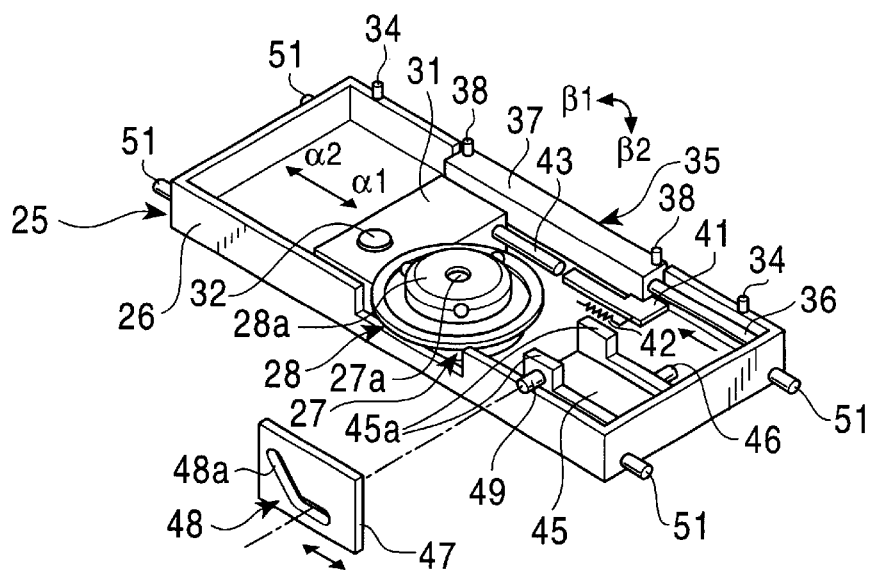
FIG. 1B is a perspective view of a driving unit thereof.
Figure 2:
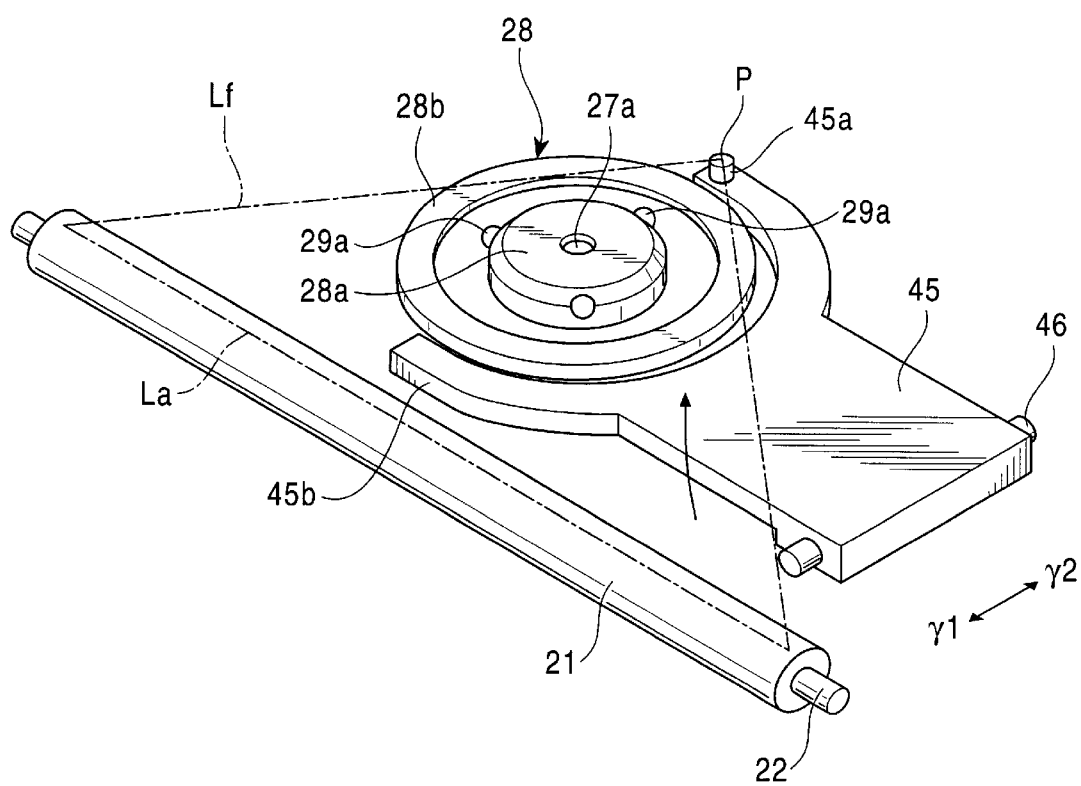
FIG. 2 is a partial perspective view of a more preferable structure of an unclamping member.
Figure 3:
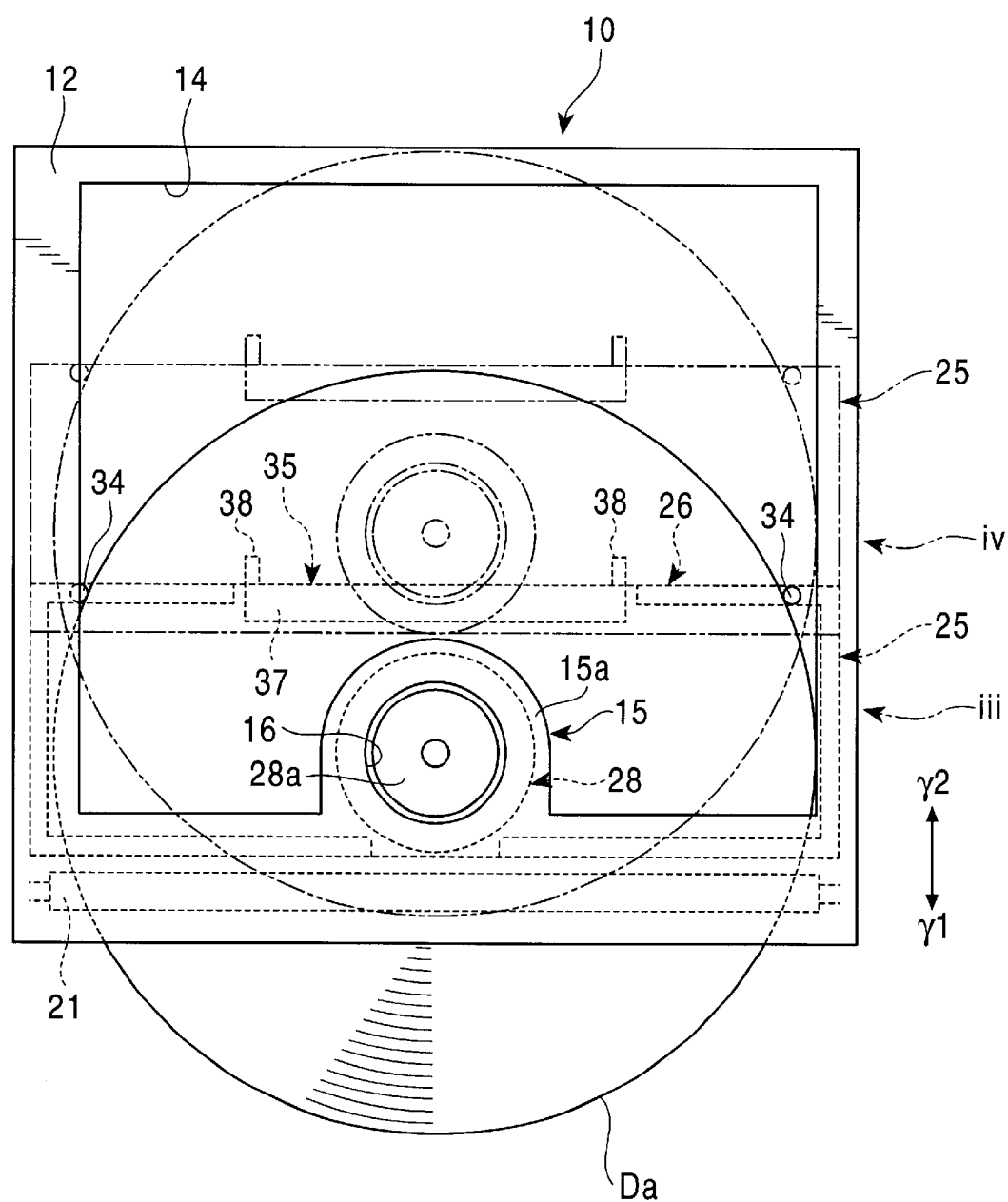
FIG. 3 is a plan view showing the loading of a large-diameter disc Da into the disc device of the first preferred embodiment.
Figure 4:
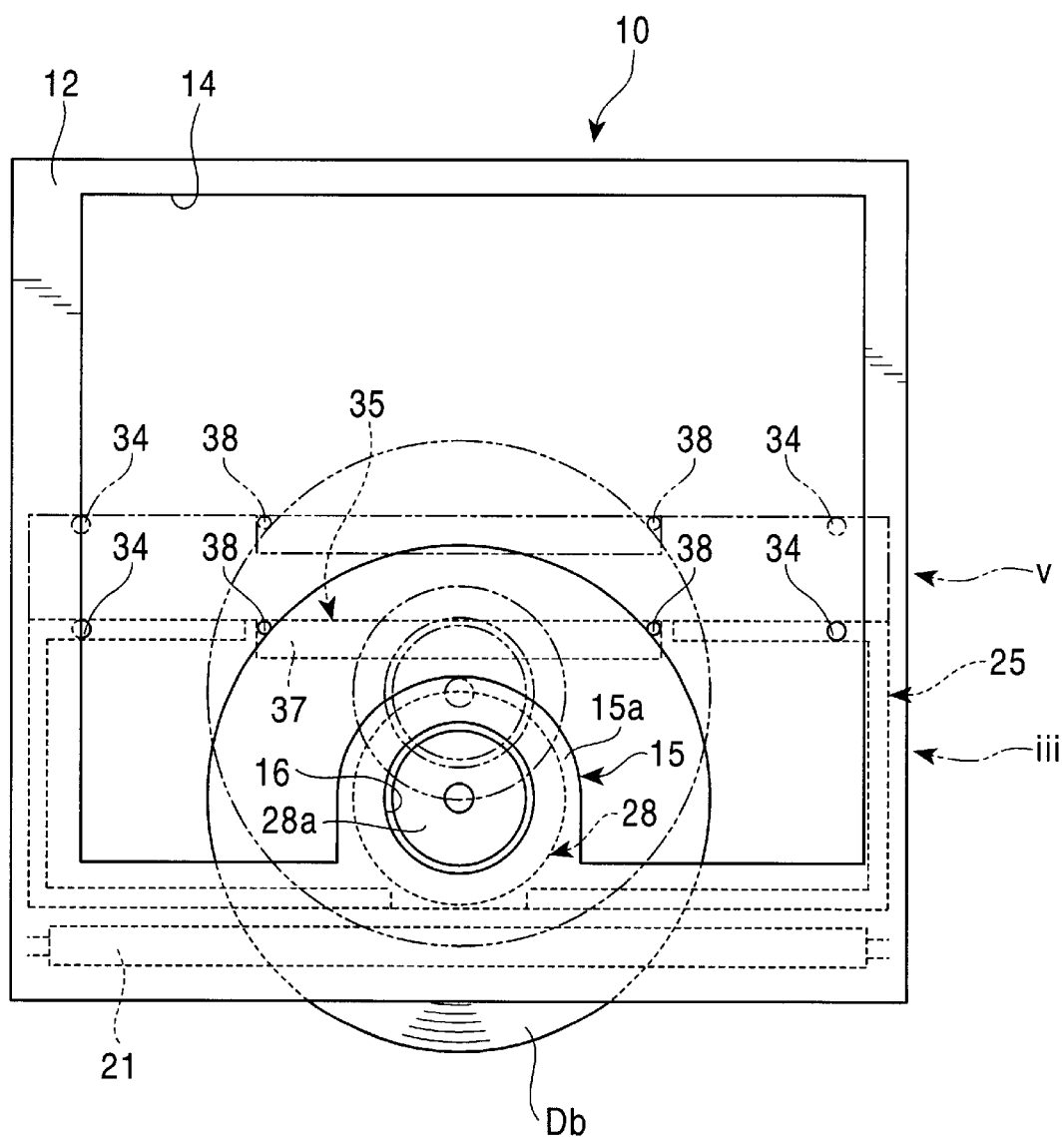
FIG. 4 is a plan view showing the loading of a small-diameter disc Db into the disc device of the first preferred embodiment.
Figure 5:
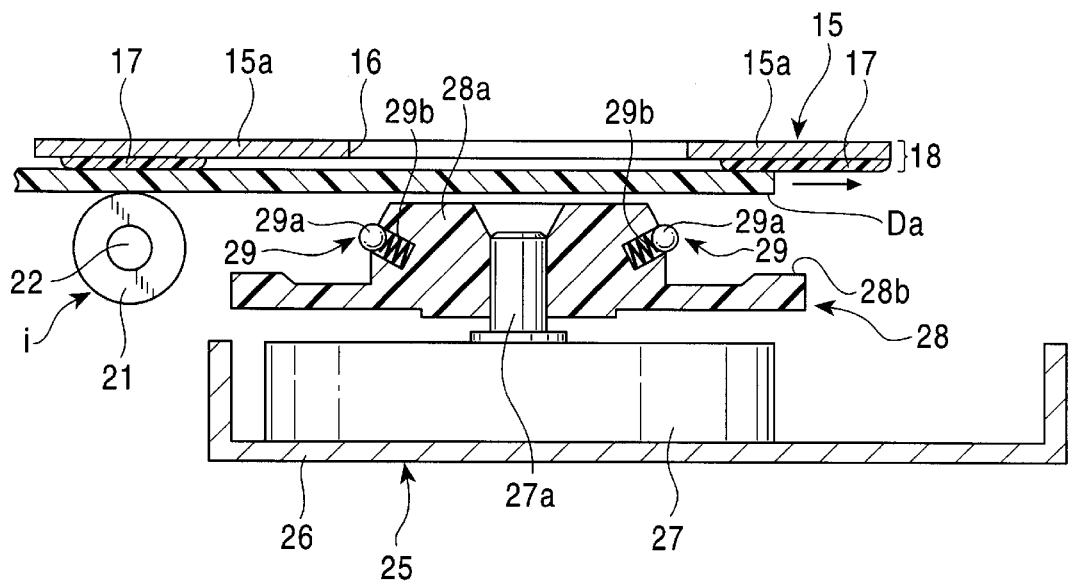
FIG. 5 is a partial enlarged sectional view showing a state in which the disc Da is supplied to the disc device of the first preferred embodiment.
Figure 6:
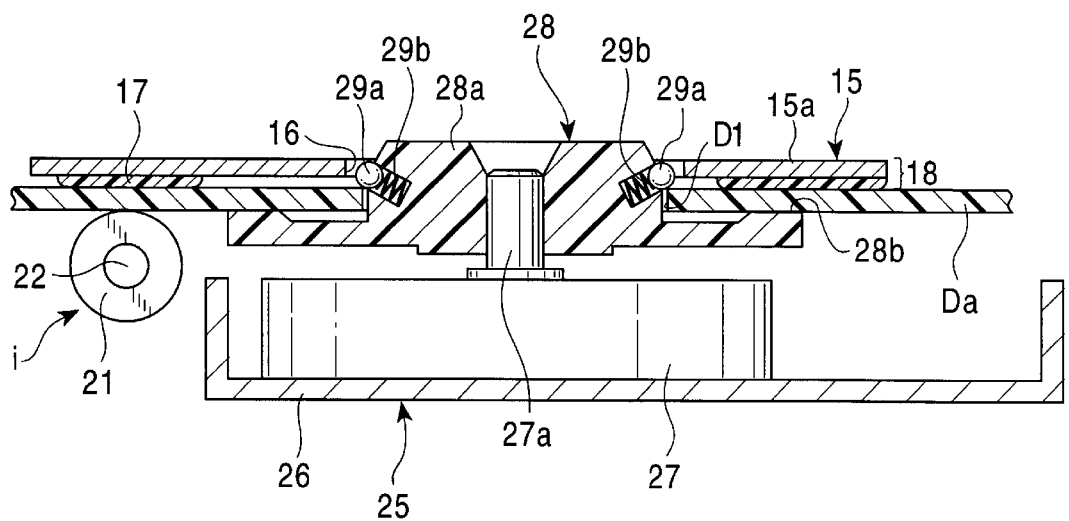
FIG. 6 is a partial enlarged sectional view showing a state in which the disc Da is clamped in the disc device of the first preferred embodiment.
Figure 7:
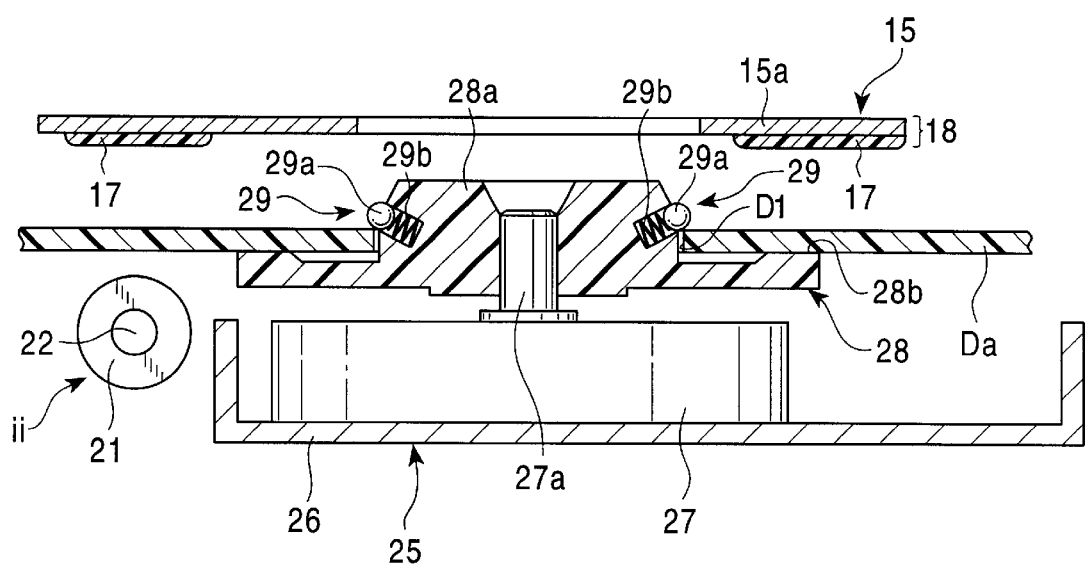
FIG. 7 is a partial enlarged sectional view showing a state in which the disc Da is driven in the disc device of the first preferred embodiment.

FIG. 1A is a perspective view of a first preferred embodiment of a disc device in accordance with the present invention. FIG. 1B is a perspective view of a driving unit of the disc device. FIG. 2 is a partial perspective view of a preferable example of an unclamping member. FIG. 3 is a plan view showing a state in which a large-diameter disc Da is loaded into the disc device. FIG. 4 is a plan view showing a state in which a small-diameter disc Db is loaded into the disc device. FIG. 5 is an enlarged sectional view showing the case where the disc Da is being guided. FIG. 6 is a partial enlarged sectional view showing the case where the disc Da is clamped. FIG. 7 is a partial enlarged sectional view illustrating the completion of the clamping of the disc Da.

A housing 10 of a disc device shown in FIG. 1 and the following relevant figures comprises a box-shaped body chassis 11 having an open top portion, and a plate member 12 secured to the top portion of the body chassis 11. An insertion/discharging opening 13 extending so as to be long in a lateral direction is formed in the front surface of the body chassis 11. From this insertion/discharging opening 13, a large-diameter disc Da having a diameter of 12 cm, and a small-diameter disc Db having a diameter of 8 cm can be inserted into the disc device. The discs Da and Db are discs designed specially for reproducing data therefrom, such as a CD or a DVD, or discs designed for reproducing data therefrom and recording data thereon.

The plate member 12 has a window 14 that is a rectangular opening, and a guide plate 15 is integrally formed with the plate member 12, at the front side of the window 14. A circular aperture 16 is formed in the guide plate 15. As shown in FIG. 5, a pressing pad (pressing member) 17, formed of a thin resin plate, is secured to the bottom surface of an outer peripheral portion 15a defining the aperture 16 of the guide plate 15. The outer peripheral portion 15a of the guide plate 15 and the pressing pad 17 form a pressing portion 18. The guide plate 15, itself, may be formed as the pressing member, in which case the pressing pad 17 is not provided.

At the body chassis 11 is provided a transporting roller 21 formed as a transporting means at the inner side of the insertion/discharging opening 13. The transporting roller 21 is mounted to the outer periphery of a roller shaft 22, and a transporting motor for driving the roller shaft 22 and the transporting roller 21 is provided inside the body chassis 11.

The transporting roller 21 can move between a clamping location i where it can clamp the disc Da or disc Db with the pressing pad 17 (see FIGS. 5 and 6) and a withdrawal location ii where it separates downward from the presser pad 17 and the disc Da or the disc Db (see FIG. 7). A moving mechanism (not shown) for moving the transporting roller 21b between the clamping location i and the withdrawal location ii is provided inside the body chassis 11.

A driving unit 25 is provided inside the body chassis 11. The driving unit 25 comprises a box-shaped driving chassis 26 having an open top portion. A spindle motor 27 is provided at the driving chassis 26, and a rotatable table 28 is secured to a rotatable shaft 27a of the spindle motor 27.

As shown in FIG. 5, the rotatable table 28 has a protrusion 28a at the center thereof in order to mount a center aperture of the disc thereto, and a disc-receiving section 28b at the top surface of an outer peripheral flange. A plurality of disc-holding means 29 are provided at a plurality of locations (such as three or four locations at equal angular intervals in a peripheral direction thereof), along the outer peripheral portion of the top portion side of the protrusion 28a. Each disc-holding means 29 comprises a spherical pressing member 29a and a biasing member 29b, which is a compression coil spring, for biasing its corresponding pressing member 29a towards a direction in which its corresponding pressing member 29a protrudes from the outer periphery of the protrusion 28a.

As shown in FIG. 1B, an optical head 31 is provided at the driving chassis 26. The optical head 31 is movable in the α directions along a radial direction of the disc. A sled mechanism (not shown) for moving the optical head in the α directions is mounted on the driving chassis 26.

The optical head 31 accommodates a light-emitting element, a light-receiving element, and various other optical elements. An objective lens 32 for gathering detection light or recording light on the recording surface of the disc is provided on the top surface of the optical head 31.

As shown in FIG. 1B, a pair of large-diameter-disc positioning members (positioning pins) 34 and 34 are secured to the top surface of the edge of the driving chassis 26 at the back side of the disc device so as to be separated from each other.

A small-diameter-disc positioning means 35 is provided between the positioning members 34 and 34. The positioning means 35 is constructed so that a rotatable member 37 is rotatably supported by a shaft 36. A pair of positioning members (positioning pins) 38 and 38 are secured to the top surface of the rotatable member 37 so as to be separated from each other by a biasing means (not shown), the rotatable member 37 is biased in the β1 direction, that is, in the direction in which the positioning members 38 and 38 extend vertically on the driving shaft 26.

A stopper 41 is provided inside the driving chassis 26 so as to be movable in the α1 direction. The stopper 41 is biased by a spring 42 in the α2 direction. When the stopper 41 is moving in the α2 direction, the stopper 41 is caught and held below the rotational fulcrum of the rotatable member 37. In this state, the rotation of the rotatable member 37 in the β1 direction is restricted.

A releasing member 43 extending in the α1 direction is provided on the optical head 31. When the optical head 31 moves in the α1 direction, and the objective lens 32 tries to move further towards the inner periphery (in the α1 direction), beyond the inner peripheral end of a data-record area of the disc Da or the disc Db, the stopper 41 is pushed by the releasing member 43 in the α1 direction, so that the stopper 41 and the rotatable member 37 disengage from each other.

An unclamping member 45 is provided at the driving chassis 26, and is supported so as to be rotatable upward with a shaft 46 serving as a fulcrum. Unclamping protrusions 45a and 45a for pushing the disc upward are provided on the top portion of the unclamping member 45.

A driving pin 49 is secured to the unclamping member 45. A driving plate 47 is supported at the front surface of the driving chassis 26 so as to be slidable in the α directions. A driving aperture 48 for guiding the driving pin 49 is formed in the driving plate 47. When the driving plate 47 moves in the α1 direction, the driving pin 49 is lifted upward by an inclined portion 48a of the driving aperture 48, so that the disc is lifted upward by the unclamping protrusions 45a and 45a.

A pair of guiding pins 51 and 51 are secured to both end surfaces of the driving chassis 26 of the driving unit 25. Guiding apertures 52 and 52 are formed in both side surfaces of the body chassis 11, with each pair of the guiding pins 51 and 51 being inserted into its corresponding pair of guiding apertures 52 and 52 from the inside of the disc device. Each guiding aperture 52 comprises a horizontal inside portion 52a that extends in the γ1–γ2 directions, and a pressing guide portion 52b extending in the height direction of the body chassis 11.

A pressing driving member 53, which is a pressing driving means, is supported at the outer side of a side plate of the body chassis 11 so as to be movable in the γ directions. Driving apertures 54 are formed in the pressing driving member 53, with the guiding pins 51 being inserted into their corresponding driving apertures 54.

When the pressing driving member 53 moves in the γ1 direction, the guiding pins 51 are lifted upward along their corresponding pressing guide portions 52b by the corresponding pressing portions 54a that are inclined portions of the driving apertures 54. On the other hand, when the pressing driving member 53 moves in the γ2 direction, the guiding pins 51 are pushed along their corresponding horizontal guide portions 52a by corresponding transporting portions 54b of the driving apertures 54, so that the driving unit 25 moves towards the back of the disc device (in the γ2 direction).

Next, a description of the operation of the disc device will be given.

FIG. 3 shows the loading of the large-diameter disc Da having a diameter of 12 cm. In a waiting state where the disc is not inserted, the pressing driving member 53, shown in FIG. 1A, moves in the γ1 direction. The guiding pins 51 are positioned at the γ1-side front ends of the corresponding horizontal guide portions 52a of the guiding apertures 52, and at the bottom ends of the corresponding vertically extending pressing guide portions 52b. Therefore, the driving unit 25 is stopped at a clamping location iii shown in FIG. 3, and the protrusion 28a of the rotatable table 28 opposes the aperture 16 formed in the guide plate 15. As shown in FIG. 5, a disc passage space is formed between the top end of the protrusion 28a of the rotatable table 28 and the guide plate 15.

When the large-diameter disc Da is inserted from the insertion/discharging opening 13, and the insertion of the disc is detected, as shown in FIG. 5, the transporting roller 21 which is ascended at the clamping location i is driven clockwise by a motor in order to clamp the large-diameter disc Da by the transporting roller 21 and the pressing pad 17 and, then, to transport it in the γ2 direction.

An optical detecting means for detecting the diameter of the disc is provided at the insertion/discharging opening 13.

When a detection is made that the inserted disc is the large-diameter disc Da, the optical head 31 is moved in the α1 direction by the sled mechanism disposed inside the driving unit 25. The optical head 31 moves further towards the inner peripheral side beyond the innermost periphery of the data-record area of the disc, so that the stopper 41 is pushed in the α1 direction by the releasing member 43, so that the restriction of the rotatable member 37 is removed.

When the edge of the large-diameter disc Da which is transported by the transporting roller 21 strikes the small-diameter-disc positioning members 38 and 38, the rotatable member 37 is rotated in the β2 direction by the transporting force of the disc, causing the positioning members 38 and 38 to become disengaged from the front edge (as viewed in the direction in which the disc is transported) of the disc. It is preferable that a withdrawing mechanism for withdrawing the positioning members 38 and 38 from the recording surface of the disc Da by further rotating the rotatable member 37 in the β2 direction be provided. When the large-diameter disc Da is transported as it is, the edge of the large-diameter disc Da strikes the large-diameter-disc positioning members 34 and 34, so that the large-diameter disc Da is positioned. In the positioned state, a center aperture D1 of the large-diameter disc Da opposes the protrusion 28a of the rotatable table 28.

When the large-diameter disc Da is transported, the guide plate 15 functions to guide the disc at a location above the disc, and prevents the disc from greatly swinging upward during the transportation of the disc.

When the large-diameter disc Da is positioned, the pressing driving member 53, shown in FIG. 1A, moves further in the γ1 direction. The guiding pins 51 are lifted upward along the pressing guiding portions 52b of the corresponding guiding apertures 52 by the pressing portions 54a of the corresponding driving apertures 54 formed in the pressing driving member 53, so that the driving unit 25 is moved upward. Therefore, as shown in FIG. 6, the protrusion 28a of the rotatable table 28 moves into the center aperture D1 of the large-diameter disc Da, and also into the aperture 16 of the guide plate 15. By the ascending force of the driving unit 25, the outer peripheral portion defining the center aperture D1 of the disc Da is sandwiched between the disc-receiving portion 28b of the rotatable table 28 and the pressing pad 17. In the disc-holding means 29 provided at the rotatable table 28, each pressing member 29a that is subjected to a biasing force of its corresponding biasing member 29b moves over the edge of the center aperture D1 and is pressed against the upper side of the edge of the center aperture D1, so that the center aperture D1 of the disc is held by the rotatable table 28 (that is, it is self-chucked).

When the driving unit 25 is at the clamping location iii shown in FIG. 3, and the center aperture D1 of the large-diameter disc Da is clamped by the rotatable table 28, a portion of the large-diameter disc Da protrudes outside the insertion/discharging opening 13. Therefore, while the large-diameter disc Da is supported at the insertion/discharging opening 13, a clamping operation is carried out, thereby making it possible to prevent the disc from moving greatly up and down when it is being clamped. It is possible to use a structure which allows the user to insert the large-diameter disc Da with his/her finger until it strikes the positioning members 34 and 34, without providing the transporting roller 21.

When the clamping of the disc is completed, the pressing driving member 53, shown in FIG. 1A, moves in the γ2 direction. When the pressing driving member 53 moves in the γ2 direction, the guiding pins 51 move downward along the corresponding pressing guiding portions 52b by the corresponding pressing portions 54a that are inclined portions of the driving apertures 54, and, as shown in FIG. 7, the rotatable table 28 which holds the large-diameter disc Da separates from the guide plate 15 and the pressing pad 17. At this time, the transporting roller 21 also moves downward and separates from the large-diameter disc Da in order to move to the withdrawal location ii.

When the pressing driving member 53 moves further in the γ2 direction, the guiding pins 51 are pushed along the corresponding horizontal guiding portions 52a by the transporting portions 54b of the corresponding driving apertures 54, so that the driving unit 25 is moved towards the back side of the disc device (in the γ2 direction). As shown in FIG. 3, the driving unit 25 stops when it has moved to a driving location iv where the large-diameter disc Da is completely drawn into the housing 10, and, at the driving location iv, the spindle motor 27 starts operating in order to drive the large-diameter disc Da by the rotatable table 28, so that the optical head 31 reproduces data recorded on the disc or records data onto the disc.

As shown in FIG. 4, when the small-diameter disc Db is inserted from the insertion/discharging opening 13, and is transported by the transporting roller 21, the detecting means, provided at the insertion/discharging opening 13, identifies that the inserted disc is the small-diameter disc Db. At this time, at the driving unit 25 that is stopped at the clamping location iii, the optical head 31 does not move greatly in the α1 direction, and the stopper 41 engages the rotatable member 37 of the small-diameter-disc positioning means 35, so that the small-diameter-disc positioning members 38 and 38, while in a vertically faced state, are restricted.

Therefore, the disc Db is positioned when the front edge of the small-diameter disc Db that has been transported strikes the positioning members 38 and 38, and a center aperture D1 of the small-diameter disc Db opposes the protrusion 28a of the rotatable table 28.

When the small-diameter disc Db is positioned, operations that are exactly the same as those carried out when the large-diameter disc Da is positioned are carried out. The driving unit 25 moves upward, and, as shown in FIG. 6, the protrusion 28a of the rotatable table 28 moves into the center aperture D1 of the disc Db and the aperture 16 of the guide plate 15, so that the center aperture D1 of the small-diameter disc Db is held by the disc holding means 29. Thereafter, as shown in FIG. 6, the rotatable table 28 that holds the disc moves downward, and the driving unit 25 is further moved towards the back side (the γ2 direction) of the device. When the driving unit 25 reaches a driving location v shown in FIG. 4, the driving unit 25 stops, and the small-diameter disc Db is driven.

When the disc is clamped to the driving unit 25 at the clamping location iii, a portion of the small-diameter disc Db protrudes from the insertion/discharging opening 13, whereas, when the driving unit 25 has moved to the driving location v shown in FIG. 4, the small-diameter disc Db is completely accommodated inside the housing 10. The driving location v where the driving unit 25 stops when the small-diameter disc Db is held is situated closer to the insertion/discharging opening 13 than the driving location iv where the driving unit 25 stops when the large-diameter disc Da shown in FIG. 3 is held.

Next, a description of a disc-discharging operation will be given.

In performing the disc-discharging operation, regardless of whether the disc is the large-diameter disc Da or the small-diameter disc Db, the pressing driving member 53, shown in FIG. 1A, moves in the γ1 direction, causing the driving unit 25 to move back to the clamping location iii along the horizontal guiding portions 52a of the corresponding guiding apertures 52. The guiding pins 51 are lifted upward along the corresponding pressing guiding portions 52b by the pressing portions 54a of the corresponding drive apertures of the pressing driving member 53. This causes the rotatable table 28 to move upward to the same position as that when the disc is clamped, shown in FIG. 6. The transporting roller 21 moves to the clamping location i.

Thereafter, the pressing driving member 53 moves slightly in the γ2 direction, so that the pressing portions 54a of the corresponding driving apertures 54 of the pressing driving member 53 cause the guiding pins 51 to move downward, thereby also causing the driving unit 25 to move downward. At this time, while either the disc Da or the disc Db is clamped by the transporting roller 21 and the pressing pad 17, the rotatable table 28 moves downward to the location shown in FIG. 5, so that the pressing members 29a of the disc-holding means 29 are forcibly removed downward from the center aperture D1 of the disc, whereby the disc is unclamped.

In this way, the pressing members 29a can be removed from the center aperture D1 as a result of moving the rotatable table 28 downward while the disc is held by the transporting roller 21. However, when the rotatable table 28 is moved downward when the disc is held only by the transporting roller 21, the portion of the disc at the back side of the device is bent downward, so that the pressing members 29a may not be reliably removed from the disc center aperture D1.

Therefore, in a preferred embodiment, when the rotatable table 28 that holds the disc has been moved upward to the location shown in FIG. 6, the driving plate 47, shown in FIG. 1B, is moved in the α1 direction by the power of the motor disposed inside the driving unit 25. Consequently, the driving pin 49 is lifted upward by the inclined portion 48a of the driving aperture 48 of the driving plate 47 in order to rotate the unclamping member 45 upward about the shaft 46. Thus, the disc is supported from the bottom by the unclamping protrusions 45a and 45a of the unclamping member 45.

When the rotatable table 28 moves downward, the disc is supported by the transporting roller 21 and the unclamping protrusions 45a and 45a from the bottom thereof, so that the pressing members 29a of the rotatable table 28 can reliably be removed from the center aperture D1 of the disc.

When the protrusion 28a of the rotatable table 28 is removed from the center aperture D1, the transporting roller 21 starts to operate in order to discharge the disc out from the insertion/discharging opening 13. When the large-diameter disc is discharged, the optical head 31, shown in FIG. 1(B), moves in the α1 direction, so that, by the releasing member 43, the stopper 41 is moved in the α1 direction. By the biasing force of, for example, a spring, the rotatable member 37 rotates in the β1 direction, causing the small-diameter-disc positioning members 38 and 38 to return to their vertical postures.

FIG. 2 is a partial perspective view showing a more preferable structure of the unclamping member 45 disposed on the driving chassis 26 of the driving unit 25.

Like the one shown in FIG. 1(B), an unclamping member 45 shown in FIG. 2 is rotatably supported at the driving chassis 26 by a shaft 46. The driving plate 47 shown in FIG. 1(B) causes the unclamping member 45 to rotate upward and downward.

The ends of the unclamping member 45 have the forms of arms that surround the periphery of the rotatable table 28. An unclamping protrusion 45a is provided only at an end of the arm situated at the back side (the γ2 side) of the device.

When the disc Da or the disc Db is clamped to the rotatable table 28, the unclamping member 45 rotates downward, so that the unclamping protrusion 45a separates downward from the disc Da or the disc Db. When a disc discharging operation is carried out, the transporting roller 21 moves upward from the withdrawal location i to the clamping location ii, and, at the same time, the unclamping member 45 rotates upward to move to an unclamping location. At this time, the disc Da or the disc Db is lifted upward by the transporting roller 21 and the unclamping protrusion 45a together in order for the center aperture D1 of the inserted disc to be separated from the disc holding means 29 of the rotatable table 28.

When the transporting roller 21 has moved upward to the clamping location i, the unclamping protrusion 45a is also lifted upward to the same height. More specifically, a contact line La of the transporting roller 21 and the disc D (actually, since both axial ends of the transporting roller and a disc D are in contact with each other, the contact line La is a line that connects the points of contact) and a pressing location P where the unclamping protrusion 45a presses the disc are raised to the same height.

Therefore, the disc Da or the disc Db can be reliably separated from the rotatable table 28. Thereafter, when the inserted disc is discharged by the transporting roller 21, the unclamping protrusion 45a functions as a guiding member of the disc that is transported, so that the disc is discharged in a horizontal posture from the insertion/discharging opening 13.

In the example shown in FIG. 2, when there is assumed an imaginary triangle Lf in which the contact line La is defined as the base and the pressing location P is defined as the vertex, the protrusion 28a of the rotatable table 28 and the pressing members 29a of the corresponding disc holding means 29 are disposed inside the imaginary triangle Lf. In this arrangement, when the disc is lifted upward by the transporting roller 21 and the unclamping protrusion 45a, the center aperture D1 is such as to be easily removed from the disc holding means 29.

The pressing location P where the unclamping protrusion 45a presses the disc preferably is set further towards the inner periphery of the disc beyond the inner peripheral end of the disc information record area. Therefore, the disc record area is not scratched by the unclamping protrusion 45a, so that, for example, a reproducing operation on the disc is not adversely affected.

In FIG. 2, the unclamping protrusion 45a is provided on only one of the arms at one end of the unclamping member 45. However, an unclamping protrusion may be provided on an end 45b of the other arm.

Figure 8:
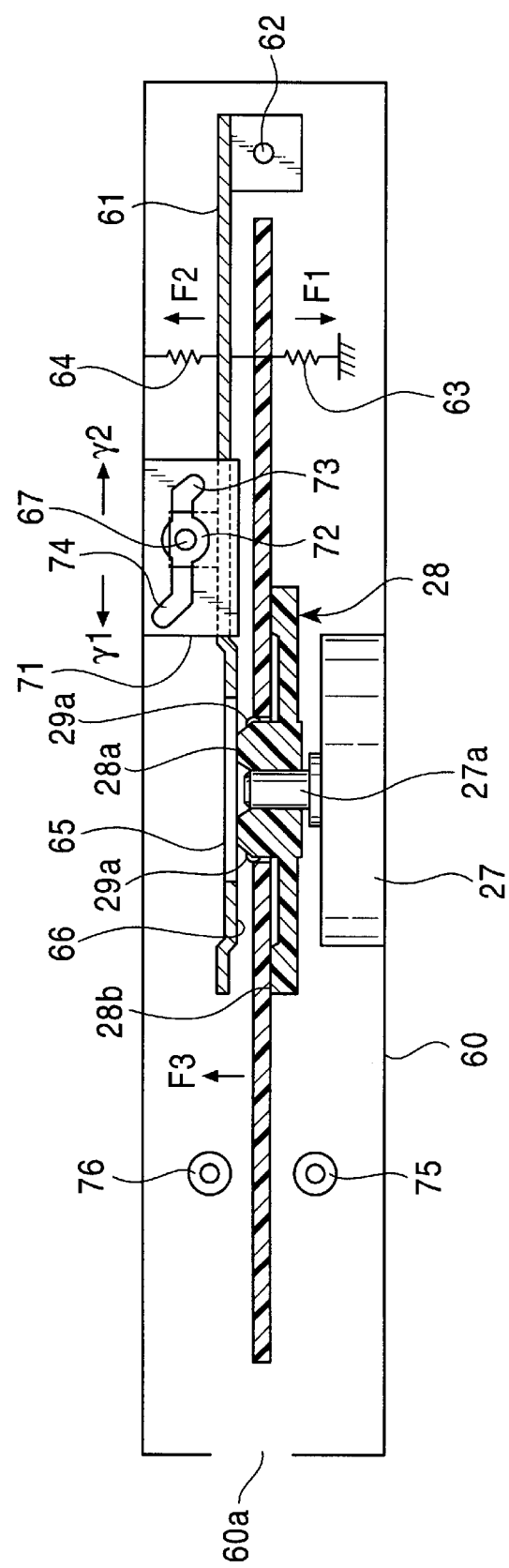
FIG. 8 is a perspective side view of a second preferred embodiment of a disc device in accordance with the present invention.
Figure 9:
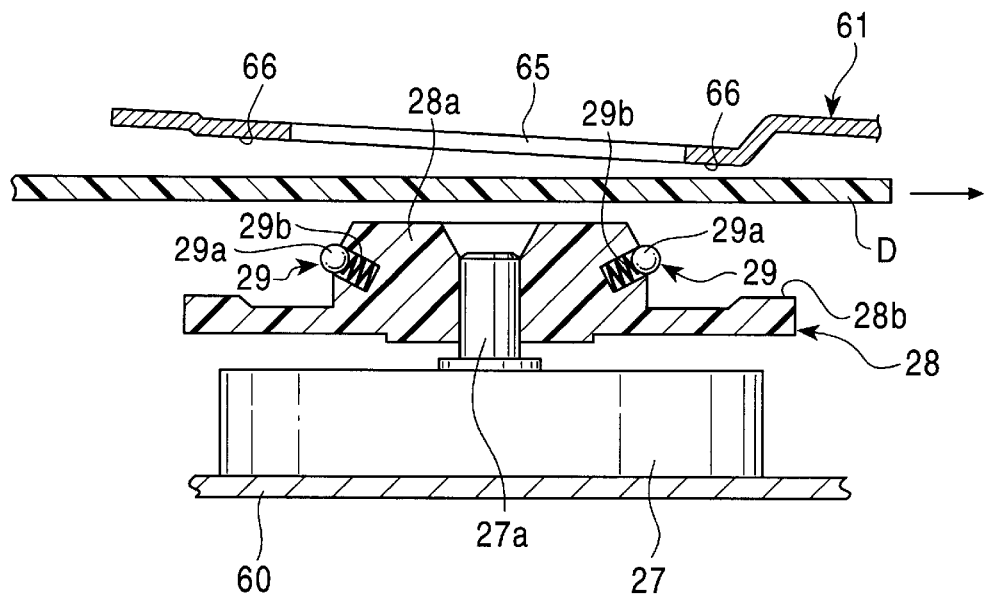
FIG. 9 is a partial enlarged sectional view showing a state in which a disc D is supplied to the disc device of the second preferred embodiment.
Figure 10:
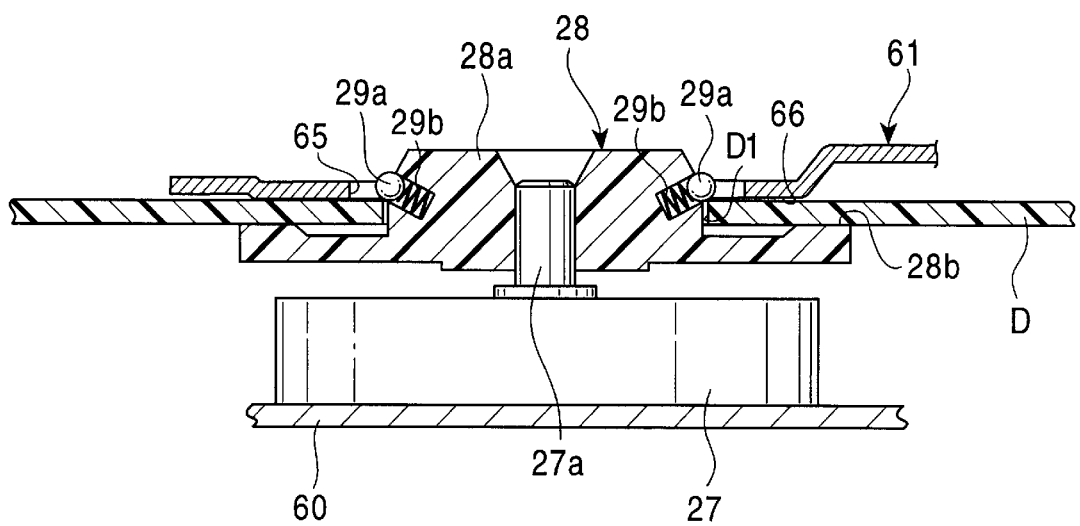
FIG. 10 is a partial enlarged sectional view showing a state in which the disc D is clamped in the disc device of the second preferred embodiment.
Figure 11:
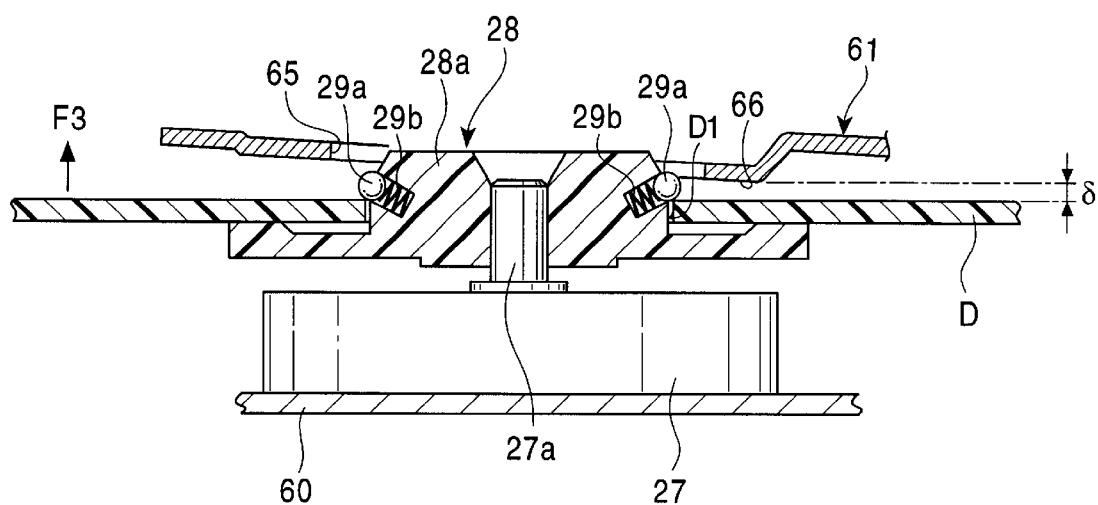
FIG. 11 is a partial enlarged sectional view showing a state in which the disc D is driven in the disc device of the second preferred embodiment.
Figure 12:
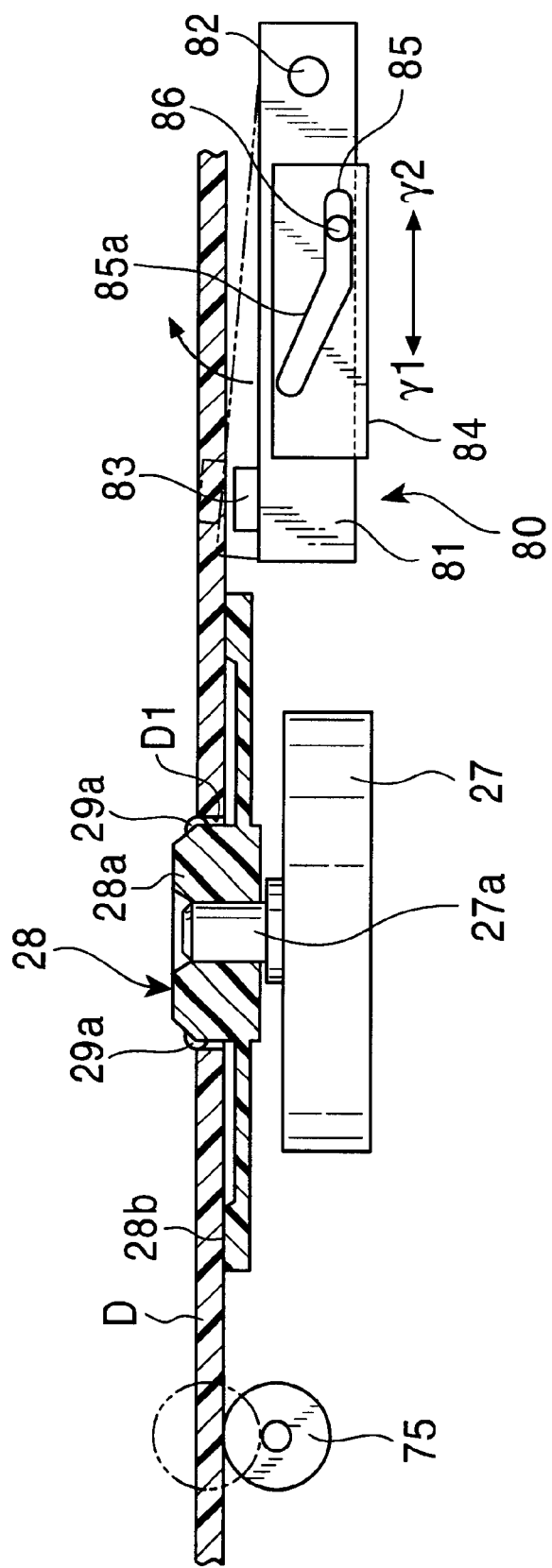
FIG. 12 is a partial enlarged sectional view showing an unclamping means used in the second preferred embodiment.
Figure 13:
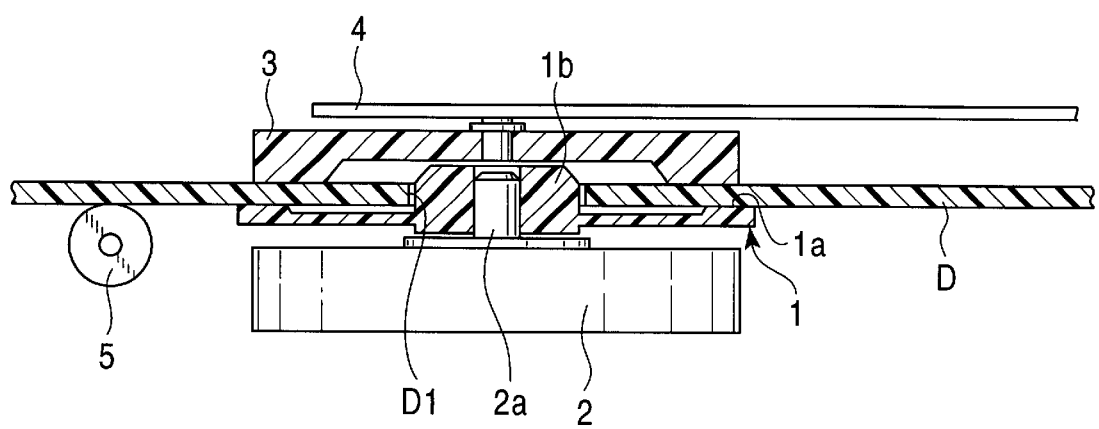
FIG. 13 is a sectional view showing a disc-clamping means of a conventional disc device.

FIG. 8 is a perspective side view of a second preferred embodiment of the present invention. FIG. 9 is a partial enlarged sectional view showing a disc D being transported. FIG. 10 is a partial enlarged sectional view showing the disc D in a clamped state. FIG. 11 is a partial enlarged sectional view of the disc D in a driven state. FIG. 12 is a partial enlarged sectional view showing the operation of an unclamping member.

In this disc device, a spindle motor 27 and a rotatable table 28 that are similar to those used in the first preferred embodiment are provided inside a housing 60. However, in this embodiment, the spindle motor 27 and the rotatable table 28 are provided at predetermined locations inside the housing 60 without moving therefrom. The rotatable table 28 comprises a protrusion 28a and a disc-receiving portion 28b, and disc-holding means 29 are provided at the outer peripheral portion of the protrusion 28a. The disc-holding means 29 each comprise a spherical pressing member 29a and a biasing member 29b.

As shown in FIG. 8, a pressing member 61, which is a plate member, is provided inside the housing 60, with the base end of the pressing member 61 being rotatably supported by a shaft 62. An aperture 65 is formed at an end of the pressing member 61. The aperture 65 opposes the protrusion 28a of the rotatable table 28. A surrounding portion of the aperture 65 in the pressing member 61 is formed as a pressing portion 66. Optionally, a pressing pad (a pressing member), formed of resin or the like, may be separately secured and provided at the bottom surface surrounding the aperture 65 of the pressing member 61.

The pressing member 61 is biased downward by a force F1 of a spring 63, and is biased upward by a force F2 of a spring 64. FIG. 8 shows the state in which the disc is driven. At this time, the force F1 and the force F2 at the pressing member 61 balance each other in the vertical direction. In this driven state, as shown in FIG. 11, a clearance δ is provided between the pressing portion 66 and the top surface of the disc D.

As shown in FIG. 8, a shaft 67 is secured to the pressing member 61. A change-over member 71 is provided at a side surface of the housing 60 so as to be driven in γ1–γ2 directions. A clearance aperture 72 is formed in the change-over member 71 so as not to provide a force of constraint to the shaft 67 during the driving of the disc. In the γ2 direction from the clearance aperture 72, a pressing groove 73, serving as a pressing driving member, inclines and is continuously formed. In the γ1 direction from the clearance aperture 72, a separation groove 74, serving as a separation driving member, inclines and is continuously formed.

An insertion/discharging opening 60a is formed in the front side of the housing 60, with the disc D being inserted from the insertion/discharging opening 60a. A pair of transporting rollers 75 and 76 are formed inwardly of the insertion/discharging opening 60a as disc-transporting means. The upper transporting roller 76 is such that its location is fixed, while the lower transporting roller 75 is provided so as to be movable up and down between a location where it clamps the disc with the transporting roller 76 and a location where it separates from the disc. The transporting roller 75 is rotationally driven in both the forward and reverse directions by a motor.

Further, as shown in FIG. 12 (not shown in FIG. 8), an unclamping means 80 is provided inside the housing 60, at the back of the spindle motor 27. An unclamping member 81 is provided at the unclamping means 80. The unclamping member 81 is rotatably supported by a shaft 82, and an unclamping protrusion 83 is provided on the top surface thereof.

A driving plate 84 is provided at the housing 60 so as to be movable in the γ1–γ2 directions. A driving aperture 85 is formed in the driving plate 84. A shaft 86 is secured to the unclamping member 81, and is inserted into the driving aperture 85. An inclined portion 85a for pushing up the unclamping member 81 is formed at the driving aperture 85.

Next, a description of the operation of the disc device of the second embodiment will be given.

When the disc D is loaded, the change-over member 71 is driven in the γ2 direction, so that, by the separation groove 74, the shaft 67 and the pressing member 61 are lifted upward. As shown in FIG. 9, a disc passage space is provided between the pressing portion 66 of the pressing member 61 and the rotatable table 28. The transporting rollers 75 and 76 come close to each other in order to place the disc D in a transportable state.

The disc D that has been inserted from the insertion/discharging opening 60a is clamped by the transporting rollers 75 and 76, and is transported to the back side of the housing 60 by the rotational force of the transporting roller 75. At this time, the pressing member 61 functions as a guide plate for guiding the movement of the disc D from above the disc D.

The disc D passes into the passage space between the rotatable table 28 and the pressing member 61. When the disc bumps into a positioning member (not shown) and is positioned, the location of the center aperture D1 of the disc D matches with the location of the protrusion 28a of the rotatable table 28.

When the disc D is positioned, the change-over member 71 moves in the γ1 direction, so that the pressing groove 73 exerts a descending force to the shaft 67, causing the pressing member 61 to move downward. At this time, the disc D is held by the pressing portion 66 of the pressing member 61, and, as shown in FIG. 10, is pushed against the disc-receiving portion 28b of the rotatable table 28. The protrusion 28a of the rotatable table 28 moves into the center aperture D1 of the disc D. At this time, the lower transporting roller 75 moves downward to the location where it separates from the disc D.

At this time, the pressing members 29a of the disc-holding means 29, provided at the rotatable table 28, clamp the center aperture D1 of the disc D and move over the peripheral edge of the center aperture D1, so that the disc D is sandwiched and held by the pressing members 29a and the disc-receiving portion 28b.

When the clamping of the disc is completed, the change-over member 71 moves in the γ2 direction, causing the shaft 67 to move into the clearance aperture 72, so that there is no longer any force of constraint on the shaft 67. The pressing member 61 is resiliently supported by the biasing force F1 of the spring 63 and the biasing force F2 of the spring 64 that are balanced. As mentioned above, the clearance 8 is formed between the disc D and the pressing portion 66. In this state, the spindle motor 27 starts to operate to rotationally drive the disc D, whereby a reproducing operation and a recording operation are performed on the disc.

During the driving of this disc, the pressing member 61 functions as a means for preventing the disc D from becoming removed from the rotatable table 28. This function is described in detail.

First, the clearance 8 is set as follows. When the disc D bumps into the pressing portion 66 as a result of being lifted upward by an inertial force due to an external shock, the clearance δ is set within a range not allowing the center aperture D1 to be removed from the pressing members 29a of the corresponding disc-holding means 29.

Further, when the disc D lifted upward by a shock bumps into the pressing portion 66, an upward force is applied to the pressing portion 66. Here, when an ascending inertial force based on the mass of the disc D is expressed as F3, the relationship between the balanced downward and upward biasing forces of the springs 63 and 64 and the inertial force F3 is set so that, even when the disc D bumps into the pressing portion 66 with the inertial force F3, the pressing portion 66 does not move upward by such an extent as to cause the center aperture D1 to be removed from the pressing members 29a.

Therefore, the pressing member 61 functions as a means for resiliently preventing the removal of the disc as a result of resiliently catching the disc that has moved upward due to shock.

Next, the operation of discharging the disc D will be described.

When the disc is discharged, the change-over member 71 moves in the γ2 direction, so that, by the separation groove 74, the shaft 67 and the pressing member 61 are lifted upward, causing the pressing portion 66, shown in FIG. 9, to separate from the disc D.

At the same time as or a short time after the above-described operations, the transporting roller 75 moves upward, and bumps into the bottom surface of the disc D. The transporting roller 75 moves upward and lifts the disc D, so that the center aperture D1 of the disc D is removed from the pressing members 29a of the rotatable table 28, and moves off the protrusion 28a of the rotatable table 28. When the center aperture D1 moves off the protrusion 28a, the upper transporting roller 76 and the transporting roller 75 clamp the disc D.

At the same time that the transporting roller 75 moves upward, the driving plate 84, shown in FIG. 12, moves in the γ2 direction, so that the shaft 86 is lifted upward by the inclined portion 85a of the driving aperture 85. This causes the unclamping member 81 to rotate upward, whereby the disc D is lifted upward by the unclamping protrusion 83.

By lifting up the disc D by both the transporting roller 75 and the unclamping member 81, the center aperture D1 is reliably removed from the pressing members 29a, thereby making it possible for the disc D to be completely removed from the protrusion 28a.

Then, when the disc D is discharged from the insertion/discharging opening 60a by the rotational force of the transporting roller 75, the driving plate 84 moves in the γ1 direction, so that the unclamping member 81 returns to its posture represented by a solid line in FIG. 12.

Even in the embodiments illustrated in FIG. 7 and the following figures, it is preferable that the unclamping member 45 shown in FIG. 2 be used as the unclamping member 81. In this case, the unclamping member 45 shown in FIG. 2 is rotatably supported by the shaft 46 inside the housing 60 shown in FIG. 8, and is made rotatable in the vertical direction by the driving plate 84 shown in FIG. 12.

As can be understood from the foregoing description, in the first preferred embodiment shown in FIG. 1 and the following relevant figures thereof, the rotatable table 28 moves upward in order for the disc to be clamped to the rotatable table 28. In the second preferred embodiment shown in FIG. 8 and the following relevant figures thereof, although the pressing member 61 moves downward in order for the disc to be clamped to the rotatable table 28, the disc also may be clamped to the rotatable table 28 by moving both the rotatable table 28 and the pressing member towards each other.

Accordingly, in the present invention, the disc can be self-chucked to the rotatable table by causing, for example, the plate-shaped pressing member to oppose the rotatable table, and moving the pressing member and the rotatable table towards each other. Therefore, the entire structure is simplified. In addition, the disc-clamping means can be made thin by forming the pressing member using a plate member.

The disc can be accommodated inside the housing by a moving force of the rotatable table, or the plate-shaped member can be used to guide the disc and to function to prevent the disc from becoming removed from the rotatable table.

The invention has been described in detail with particular reference to preferred embodiments thereof and illustrative examples, but it will be understood that variations and modifications can be effected within the spirit and scope of the invention.

What is claimed is:

1. A disc device comprising:
   a rotatable table including a disc-receiving portion for receiving a surface of a disc, a protrusion for insertion into a center aperture of the disc, and a disc-holding means for holding a disc on the rotatable table by elastically applying pressure to an inner peripheral edge surrounding the center aperture of the disc;
   a pressing member opposing the disc-receiving portion of the rotatable table; and
   a pressing driving means for driving at least one of the rotatable table and the pressing member in a direction in which the rotatable table and the pressing member move towards each other in a manner that causes the disc-holding means to engage the inner peripheral edge of the disc.

2. A disc device according to claim 1, wherein:
   the pressing driving means is configured to drive the rotatable table toward the pressing member in a manner that causes the disc-holding means to engage the inner peripheral edge of the disc.

3. A disc device according to claim 1, wherein:
   the pressing driving means is configured to drive the pressing member toward the rotatable table in a manner that causes the disc-holding means to engage the inner peripheral edge of the disc.

4. A disc device comprising:
   a rotatable table including a disc-receiving portion for receiving a surface of a disc, a protrusion for insertion into a center aperture of the disc, and a disc-holding means for elastically applying pressure to an inner peripheral edge surrounding the center aperture of the disc;
   a plate member opposing the disc-receiving portion of the rotatable table;
   a driving chassis for supporting the rotatable table, the driving chassis being movable relative to the plate member; and
   a pressing driving means for driving the rotatable table toward the plate member in a manner that causes the disc-holding means to engage the inner peripheral edge of the disc;
   wherein a disc-passage space is formed between the plate member and the rotatable table when the plate member and the rotatable table are separated from each other; and
   wherein the plate member functions as a guide plate for the disc that passes into the passage space.

5. A disc device according to claim 4, wherein:
   the plate member includes an inner peripheral edge defining an aperture in the plate member; and
   wherein the inner peripheral edge of the plate member is arranged to receive the protrusion of the rotatable table into the aperture, such that the disc is sandwiched by the disc-receiving portion of the rotatable table and the plate member.

6. A disc device according to claim 5, further comprising:
   a housing;
   a head for reproducing information from the disc and/or recording information onto the disc;
   a guiding portion for moving the driving chassis to a driving position in which the disc held by the rotatable table is completely accommodated inside the housing.

7. A disc device according to claim 4, wherein:
   the driving chassis is movable between a clamping location in which the rotatable table opposes the plate member, and a driving location in which the disc held by the rotatable table is completely accommodated inside the housing.

8. A disc device as in claim 4, further comprising:
   a pair of large-diameter-disc positioning members operable to position a large-diameter-disc relative to the rotatable table.

9. A disc device as in claim 4, further comprising:
   a small-diameter-disc positioning means for positioning a small-diameter disc relative to the rotatable table, the small-diameter-disc positioning means being movable to a position in which the small-diameter-disc positioning means does not interfere with the movement of a large-diameter disc.

10. A disc device as in claim 4, further comprising:
    an unclamping member operable to apply upward pressure to a bottom surface of the disc and to disengage the disc-holding means from the inner peripheral edge of the disc.

11. A disc device as in claim 10, further comprising:
    an unclamping member support shaft rotatably supporting the unclamping member;
    wherein the unclamping member further includes:
      a pair of unclamping arms surrounding the periphery of the rotatable table; and
      at least one unclamping protrusion mounted on a top surface of at least one of the unclamping arms, the unclamping protrusion configured to apply upward pressure on the bottom surface of the disc when the unclamping member is rotated about the unclamping member support shaft.

12. A disc device comprising:
    a rotatable table including a disc-receiving portion for receiving a surface of a disc, a protrusion for insertion into a center aperture of the disc, and a disc-holding means for holding a disc on the rotatable table by elastically applying pressure to an inner peripheral edge surrounding the center aperture of the disc;
    a pressing member opposing the disc-receiving portion of the rotatable table;
    a pressing member support shaft rotatably supporting the pressing member; and
    a pressing driving means for driving the pressing member toward the rotatable table in a manner that causes the disc-holding means to engage the inner peripheral edge of the disc.

13. A disc device according to claim 12, wherein:
    the pressing driving means further comprises a change-over means for forming a gap between the disc and the pressing member by moving the pressing member in a direction away from the rotatable table.

14. A disc device according to claim 13, wherein:
    the gap between the disc and the pressing member is set such that the pressing member substantially prevents the disc from being removed from the holding means.

15. A disc device according to claim 14, further comprising:
- a housing having an insertion/discharge opening formed therein;
- a head for reproducing information from the disc and/or recording information onto the disc;
- a transporting means for supplying the disc between the rotatable table and the pressing member;
- wherein the rotatable table, the pressing member, the head, and the transporting means are provided inside the housing.

16. A disc device according to claim 14, wherein the pressing member is elastically supported while the gap is set.

17. A disc device according to claim 13, wherein the inner peripheral edge of the disc is engaged by the disc-holding means as a result of the pressing member moving towards the rotatable table; and wherein the gap is formed as a result of the pressing member moving away from the rotatable table.

18. A disc device as in claim 12, further comprising:
- an unclamping member operable to apply upward pressure to a bottom surface of the disc and to disengage the disc-holding means from the inner peripheral edge of the disc.

19. A disc device as in claim 18, further comprising:
- an unclamping member support shaft rotatably supporting the unclamping member;
  - wherein the unclamping member further includes:
    - a pair of unclamping arms surrounding the periphery of the rotatable table; and
    - at least one unclamping protrusion mounted on a top surface of at least one of the unclamping arms, the unclamping protrusion configured to apply upward pressure on the bottom surface of the disc when the unclamping member is rotated about the unclamping member support shaft.

* * * * *

UNITED STATES PATENT AND TRADEMARK OFFICE
CERTIFICATE OF CORRECTION

PATENT NO. : 6,714,507 B2
DATED : March 30, 2004
INVENTOR(S) : Kato

It is certified that error appears in the above-identified patent and that said Letters Patent is hereby corrected as shown below:

Title page,
Item [*] Notice, delete the phrase "by 169 days" and insert -- by 232 days --

Signed and Sealed this

Twelfth Day of October, 2004

JON W. DUDAS
*Director of the United States Patent and Trademark Office*